Figure 1:
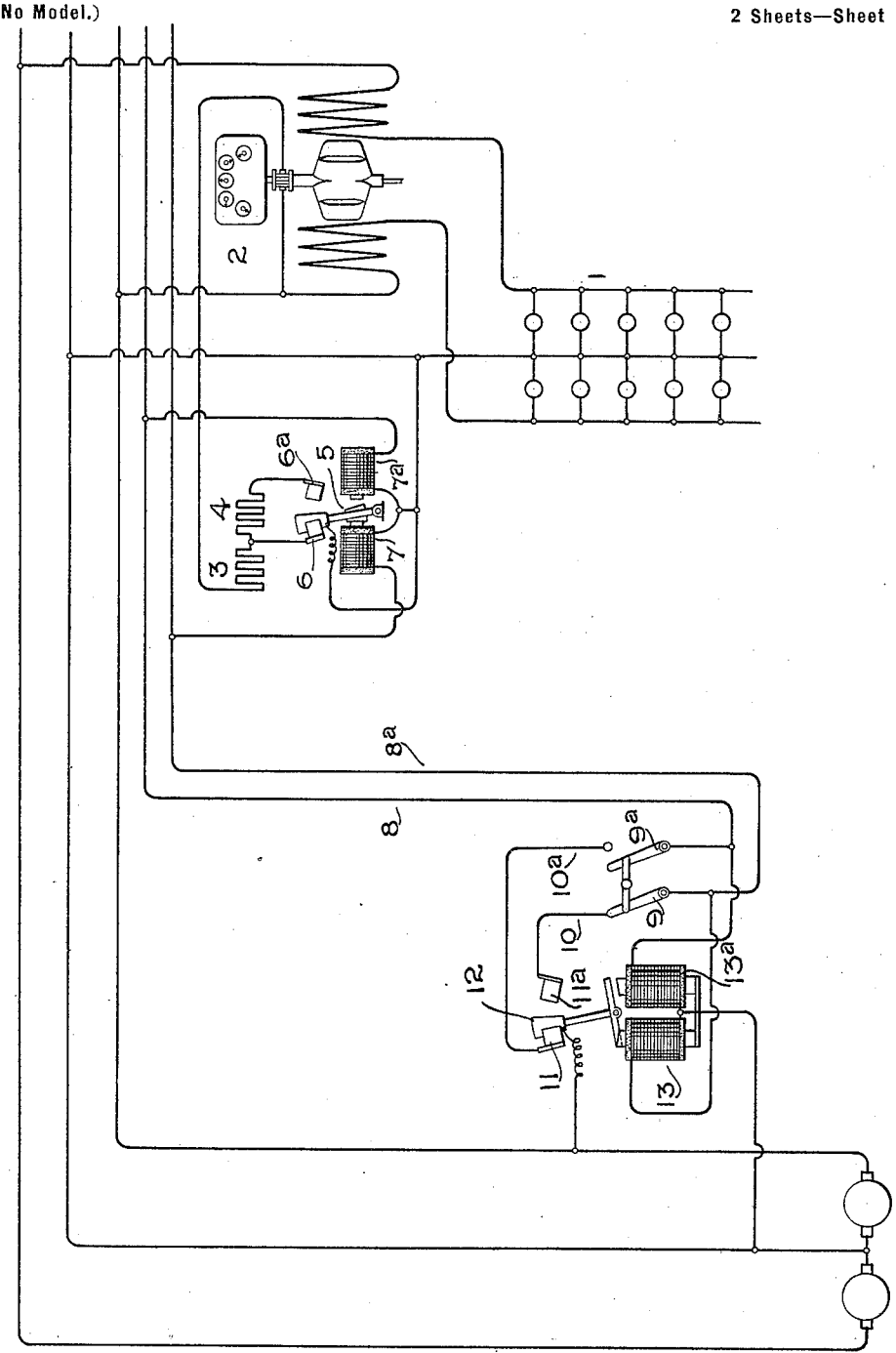

No. 657,828. Patented Sept. 11, 1900.
E. OXLEY.
SYSTEM OF MULTIPLE RATE METERING.
(Application filed July 31, 1899.)

(No Model.) 2 Sheets—Sheet 2.

Witnesses.
Edward Williams, Jr.
Alex F. Macdonald.

Inventor.
Eustace Oxley
by Albert G. Davis
Atty.

UNITED STATES PATENT OFFICE.

EUSTACE OXLEY, OF LYNN, MASSACHUSETTS, ASSIGNOR TO THE GENERAL ELECTRIC COMPANY, OF NEW YORK.

SYSTEM OF MULTIPLE-RATE METERING.

SPECIFICATION forming part of Letters Patent No. 657,828, dated September 11, 1900.

Application filed July 31, 1899. Serial No. 725,603. (No model.)

*To all whom it may concern:*

Be it known that I, EUSTACE OXLEY, a subject of the Queen of Great Britain, residing at Lynn, in the county of Essex and State of Massachusetts, have invented certain new and useful Improvements in Systems of Multiple-Rate Metering, (Case No. 976,) of which the following is a specification.

My present invention relates to controlling systems for multirate electric meters, the object being to permit the meters to be set for different registering rates from a controlling-point accessible to an employee of the supply company and to automatically insure the continuance of the desired rate of registering until changed from said controlling-point irrespective of fraudulent interference on the part of a consumer with the metering apparatus.

In systems of current distribution or supply it is desirable to encourage the use of current during periods when the load is light, so as to promote a higher efficiency in the operation of the system, and to this end it is the practice with some supply companies to install at the consumer's station metering apparatus having different rates of registration, the registration during periods of light load on the system being slower than under conditions of average or maximum load, thereby giving the consumer a discount for current consumed during periods of light load. In such systems some system of control must be provided in order to change the meter connections so as to effect a change of registration. I have heretofore devised and patented various methods of effecting this result. In my present invention I provide an independent control-circuit extending from a controlling-point to the point or points at which the multirate-meters are installed, and through the influence of such control-circuit I cut into operation one or the other of two meters or registering devices connected with the consumer's circuit and having different registering rates or I vary the registering rate of a single meter. I employ the term "multiple-rate" or "multirate" meter throughout this specification to designate any organization in which the consumption of current during different periods at times of high and low load may be integrated or charged for at different rates. The controlling-circuit is so arranged that when a given rate of registration is established any change of the connections on the part of the consumer to change the meter connections so as to alter the rate will be immediately corrected by automatic action and if not corrected will leave a visible indication at the controlling-station of the change of connections. I effect the result by providing at the consumer's station and at the controlling-point electromagnetic devices mutually responsive by which a change of the meter connections at a consumer's station will operate an electromagnetic controller at the controlling-station, which produces a change in the controlling-circuit and resets the meter-circuits to the position of last adjustment by a switch at the controlling-station.

The several features of novelty will be more particularly described hereinafter and will be definitely indicated in the claims.

Figure 2:
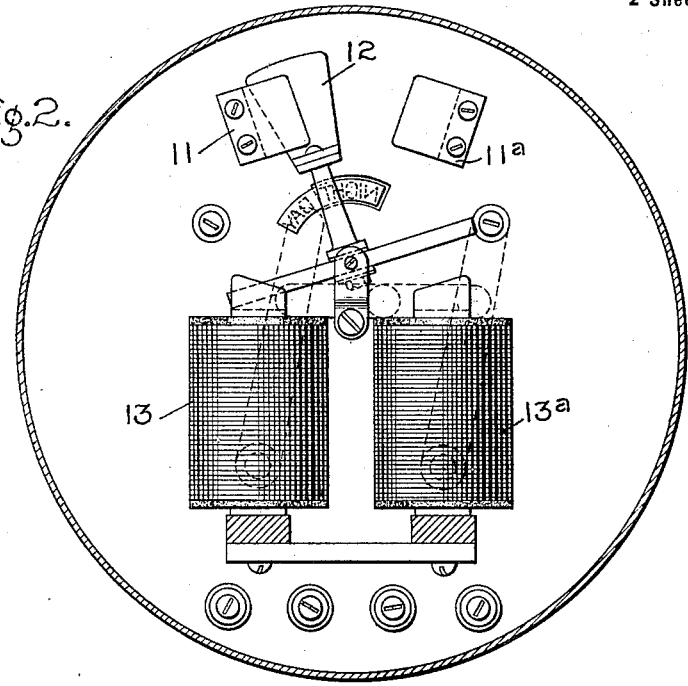
Figure 3:
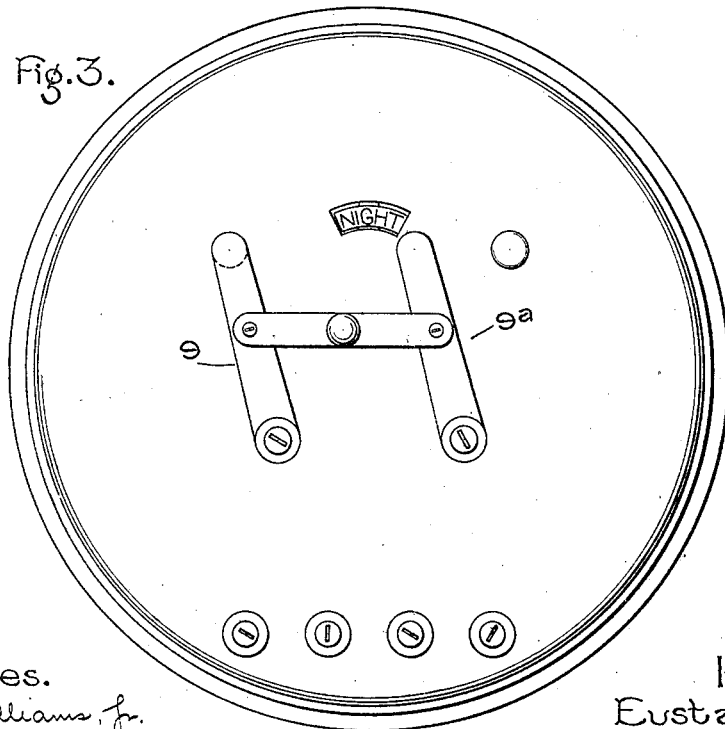

In the accompanying drawings, Figure 1 is a diagrammatic view of a system embodying my improvements. Fig. 2 is a rear sectional view of an indicator employed at the central station, and Fig. 3 is a face view of the same.

I have shown the system in Fig. 1 as applied to an ordinary three-wire distributing system. This is done, however, merely by way of example, as the improvements may be applied to any system of distribution.

1 represents a group of lamps or other current-consuming devices employed at the consumer's station fed through a meter 2. This meter may be of any approved type. As shown, it is of the well-known Thomson recording-wattmeter type, in which a field-magnet is energized by the current fed to the translating devices and the armature is in shunt across a pair of the supply-wires, said shunt being controlled by an electromagnetic device for cutting in resistance, so as to vary the registering rate of the meter, or, if preferred, two independent meters adjusted, primarily, for different rates may be employed or one meter with a plurality of dials, as is well understood in the art.

3 represents a fixed resistance interposed in the shunt-circuit, and 4 an auxiliary resistance which slows down the rate of registering when it is cut into the shunt-circuit. This change is controlled by an armature 5, carrying a switch-blade adapted to engage either of a pair of contacts 6 6ª, connecting, respectively, with the terminals of the auxiliary resistance 4. The position of the armature is controlled by two magnets 7 7ª, the coils of which have a common connection with the switch-blade of the armature 5 and are respectively connected at the other terminal with two wires 8 8ª of a control-circuit leading from the consumer's station to a suitable controlling-point. (Shown in this instance as the central station.) At such controlling-point is installed a switch 9 9ª, which may be hand-controlled, as indicated in the diagram, by which either control-wire may be connected with a corresponding wire 10 10ª, terminating in two contacts 11 11ª, coöperating with the switch-blade 12. The position of this switch-blade is controlled by two magnets 13 13ª, which may be mounted on a common frame, but should be magnetically insulated at the yoke, which may be conveniently done by forming the yoke of brass or some other diamagnetic material. One set of terminals of the magnet-coils connect, respectively, with the control-wires and the other set lead by a common connection to one of the supply-wires. (Shown in this instance as a neutral wire.)

The controlling-magnet may with advantage be housed in an inclosing case provided with a window, through which may be displayed an indication as to its position of adjustment. As shown in Fig. 2, this may be effected by mounting on the standard which supports the switch-blade 12 a strip or segment having the words "Night" and "Day" painted or otherwise marked thereon in such position that one or the other of the words will be displayed through the window, according to the position of the switch-blade. The hand control-switch may be mounted on the face of the apparatus, and the whole may be supported upon a switchboard or any other suitable part of the station.

In the position of the parts shown in Fig. 1 the auxiliary resistance 4 is cut out, and the motor is therefore registering at a high rate. When the low-rate period arrives, the switch 9 9ª is shifted to the right, thus disconnecting the control-wire 8ª and connecting the control-wire 8 with wire 10ª. Potential is thus thrown from a live wire of the system upon the control-wire and connects with a point of lower potential, as the negative wire, over two branches, one including the coil 13ª and the other including the coil 7ª of the meter-controlling switch. Thus the meter connections will be changed and the resistance 4 cut in, changing its rate of registration. Simultaneously the magnetic device at the controlling-station is changed and the circuit-changer 12 is shifted into engagement with contact 11ª.

Let us suppose that in the condition shown in the drawings the consumer should fraudulently attempt to change the meter connections, so as to put his meter on a slower rate during full-load period. He might accomplish this by electrically connecting one of the live wires of the system with one of the connections of coil 7ª, the passage of current to the neutral wire energizing such coil and shifting his meter-controlling device to the open stop 6ª, and thereby cutting resistance into the meter-circuit; but such connection will throw potential upon control-wire 8, and a branch current will pass through the magnet 13ª at the controlling-station to the neutral wire, thereby throwing the switch-blade 12 to contact 11ª. Immediately on the engagement of these contacts the control-wire 8ª is brought into communication with the potential-main 1 of the system, thereby sending the current to the neutral wire 2 by two branches, one including the magnet 13 and the other including the magnet 7 at the consumer's station, thereby restoring circuit-changers 5 and 12 to the position in which they were last set by the controlling operator. The consumer's controlling device will of course in practice be housed within an inclosure to which the consumer has no access for hand manipulation of the switch-arm. Any temporary accidental condition of the circuits of a similar character would have a similar action upon the apparatus to that just considered, while a permanent derangement of the circuit would give notice at the controlling-station of the change by the position of the indicator shown in Fig. 2. It will thus be seen that I provide a control-circuit extending from a controlling-point to the consumer or consumers' stations, in which is interposed electromagnet apparatus mutually responsive by which a disturbance of the consumer's meter-circuit will act upon the apparatus at the central station and change the controlling connections, so as to restore the subscriber's meter to the position at which it was set before the disturbance arose.

What I claim as new, and desire to secure by Letters Patent of the United States, is—

1. A meter system, comprising a supply-circuit, a multirate metering device, means for fixing its rate of registration from a distant point of control, and a control-circuit for automatically restoring when disturbed the rate for which it is set.

2. A metering system, comprising a supply-circuit, current-consuming devices, and a multirate metering device at the consumer's station, a control-circuit extending to said station from a distant point, electromagnetic devices operated by said control-circuit for changing the rate of meter registration, and an electromagnetic device at the control-station responsive to a change of the meter connections and adapted to restore them if changed independently of the control-station.

3. An electric metering system, comprising a supply-circuit, current-consuming devices, a multirate metering device, a control-circuit for changing the rate of meter registration, and a magnetic device in said circuit responsive to an irregular change of the meter connections, for connecting the control-circuit to restore such connections.

4. An electric metering system, comprising a supply-circuit, current-consuming devices, multirate metering apparatus, a control-circuit therefor extending to a control-station, a meter-switch operated thereby, and a circuit-changer at the control-station, responsive to a change of said switch to automatically vary the control-circuit and restore said switch if abnormally shifted.

5. A three-wire electric metering system, comprising a supply-circuit, current-consuming devices, a two-rate metering apparatus, a magnetically-controlled circuit-changer for such apparatus between the control-wires and the neutral wire, determining the rate of registration, two control-wires extending to a controlling-station for operating said circuit-changer, a switch at the control-station for energizing any desired control-wire, a magnetic circuit-changer at the control-station in the control-circuit, and contacts operated thereby to connect the potential wire with the open control-wire if the meter circuit-changer be operated independently of the control-switch.

In witness whereof I have hereunto set my hand this 27th day of July, 1899.

EUSTACE OXLEY.

Witnesses:
DUGALD McKILLOP,
JOHN McMANUS.